US011539701B2

(12) United States Patent
Daniel

(10) Patent No.: US 11,539,701 B2
(45) Date of Patent: *Dec. 27, 2022

(54) NETWORK ACCESS POINT

(71) Applicant: British Telecommunications Public Limited Company, London (GB)

(72) Inventor: Joshua Daniel, London (GB)

(73) Assignee: British Telecommunications Public Limited Company, London (GB)

(*) Notice: Subject to any disclaimer, the term of this patent is extended or adjusted under 35 U.S.C. 154(b) by 332 days.

This patent is subject to a terminal disclaimer.

(21) Appl. No.: 16/620,355

(22) PCT Filed: Jun. 8, 2018

(86) PCT No.: PCT/EP2018/065234
§ 371 (c)(1),
(2) Date: Dec. 6, 2019

(87) PCT Pub. No.: WO2018/228951
PCT Pub. Date: Dec. 20, 2018

(65) Prior Publication Data
US 2020/0178075 A1    Jun. 4, 2020

(30) Foreign Application Priority Data

Jun. 12, 2017  (EP) .................................... 17175394

(51) Int. Cl.
*H04L 29/06* (2006.01)
*H04L 9/40* (2022.01)
(Continued)

(52) U.S. Cl.
CPC .............. *H04L 63/10* (2013.01); *G06F 16/27* (2019.01); *H04L 9/3247* (2013.01);
(Continued)

(58) Field of Classification Search
CPC ................... H04L 63/10; H04L 9/3247; H04L 2209/38; H04L 2209/80; H04L 63/12;
(Continued)

(56) References Cited

U.S. PATENT DOCUMENTS 6,535,493 B1    3/2003  Lee et al.
8,151,322 B2 *  4/2012  Chen ....................... H04L 63/08
                                                            726/28
(Continued)

FOREIGN PATENT DOCUMENTS

CN      107018432 A       8/2017
EP      2894890 A1 *      7/2015    ............ H04W 12/06
(Continued)

OTHER PUBLICATIONS

Antonopoulos A M., "Mastering Bitcoin-Unlocking Digital Cryptocurrencies," Apr. 2014, Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.
(Continued)

*Primary Examiner* — Joseph P Hirl
*Assistant Examiner* — Ka Shan Choy
(74) *Attorney, Agent, or Firm* — Patterson Thuente, P.A.

(57) ABSTRACT

A computer implemented method of a network access point for secure network access by a mobile computing device, the mobile device being associated with the access point by a digitally signed record in a blockchain wherein the blockchain is accessible via a network and includes a plurality of records validated by miner computing components, the method including receiving a request from another network access point to associate the mobile device with the other access point, the request having associated identification information for the mobile device; responsive to a verifica-
(Continued)

tion of an entitlement of the mobile device to access the network, generating a new record for storage in the blockchain, the new record associating the mobile device with the other access point and being validated by the miner components such that the other access point provides access to the network for the mobile device based on the validation of the new record.

11 Claims, 3 Drawing Sheets

(51) Int. Cl.
    *H04W 12/08*     (2021.01)
    *G06F 16/27*     (2019.01)
    *H04L 9/32*     (2006.01)
    *H04W 12/06*     (2021.01)
    *H04W 88/08*     (2009.01)
    *H04L 9/00*     (2022.01)

(52) U.S. Cl.
    CPC ........... *H04W 12/06* (2013.01); *H04W 12/08* (2013.01); *H04W 88/08* (2013.01); *H04L 9/50* (2022.05)

(58) Field of Classification Search
    CPC ...... H04L 9/3239; G06F 16/27; H04W 12/06; H04W 12/08; H04W 88/08
    See application file for complete search history.

(56) References Cited

U.S. PATENT DOCUMENTS

| | | |
|---|---|---|
| 8,590,057 B1 | 11/2013 | Mayblum et al. |
| 9,807,106 B2 | 10/2017 | Daniel |
| 10,015,671 B2 * | 7/2018 | Zaifuddin ........... H04W 12/033 |
| 10,082,719 B2 | 9/2018 | Xie |
| 10,534,913 B2 | 1/2020 | Daniel |
| 10,839,378 B1 | 11/2020 | Srinivasan et al. |
| 11,122,500 B2 | 9/2021 | Salgueiro et al. |
| 2004/0213260 A1 | 10/2004 | Leung et al. |
| 2005/0009517 A1 | 1/2005 | Maes |
| 2009/0061859 A1 | 3/2009 | Bengtsson |
| 2011/0130117 A1 | 6/2011 | Fan et al. |
| 2012/0044862 A1 * | 2/2012 | Chen ....................... H04W 8/08 370/328 |
| 2013/0044733 A1 | 2/2013 | Jang |
| 2014/0323088 A1 * | 10/2014 | Hsieh ................... H04W 76/10 455/411 |
| 2014/0355520 A1 | 12/2014 | Wallis |
| 2014/0355564 A1 | 12/2014 | Cherian et al. |
| 2014/0368601 A1 | 12/2014 | Decharms |
| 2015/0040195 A1 | 2/2015 | Park et al. |
| 2015/0181424 A1 | 6/2015 | Hardy |
| 2015/0195713 A1 | 7/2015 | Canpolat et al. |
| 2015/0373029 A1 | 12/2015 | Evenden et al. |
| 2016/0142911 A1 | 5/2016 | Kreiner et al. |
| 2016/0180338 A1 | 6/2016 | Androulaki et al. |
| 2016/0183081 A1 * | 6/2016 | Flores Cuadrado .. H04M 15/52 455/558 |
| 2016/0261690 A1 | 9/2016 | Ford |
| 2016/0364787 A1 | 12/2016 | Walker et al. |
| 2017/0053460 A1 | 2/2017 | Hauser et al. |
| 2017/0124534 A1 | 5/2017 | Savolainen |
| 2017/0132630 A1 | 5/2017 | Castinado et al. |
| 2017/0206523 A1 | 7/2017 | Goeringer et al. |
| 2018/0025166 A1 | 1/2018 | Daniel |
| 2018/0049019 A1 | 2/2018 | Haran et al. |
| 2018/0197173 A1 | 7/2018 | Durvasula et al. |
| 2018/0285585 A1 | 10/2018 | Daniel |
| 2018/0322259 A1 | 11/2018 | Solow et al. |
| 2019/0108364 A1 * | 4/2019 | Roennow ............. G06Q 20/389 |
| 2019/0230491 A1 | 7/2019 | Yu et al. |
| 2019/0253409 A1 * | 8/2019 | Spencer .............. H04L 63/0876 |
| 2019/0386832 A1 | 12/2019 | Palyutina et al. |
| 2020/0007316 A1 * | 1/2020 | Krishnamacharya ....................... H04L 63/0815 |
| 2020/0242603 A1 | 7/2020 | Salkintzis |
| 2020/0380090 A1 | 12/2020 | Marion |

FOREIGN PATENT DOCUMENTS

| | | |
|---|---|---|
| GB | 2540976 A | 2/2017 |
| GB | 2540977 A | 2/2017 |
| WO | WO-2016128491 A1 | 8/2016 |
| WO | WO2017021153 | 2/2017 |
| WO | WO2017021154 | 2/2017 |
| WO | WO2017021155 | 2/2017 |
| WO | WO2017167547 | 10/2017 |
| WO | WO2017167548 | 10/2017 |
| WO | WO2017167549 | 10/2017 |
| WO | WO-2017184160 A1 | 10/2017 |
| WO | WO-2018125989 A2 | 7/2018 |
| WO | WO2018178026 | 10/2018 |
| WO | WO2018178034 | 10/2018 |
| WO | WO2018178035 | 10/2018 |
| WO | WO2018206374 | 11/2018 |
| WO | WO2018206405 | 11/2018 |
| WO | WO2018206406 | 11/2018 |
| WO | WO2018206407 | 11/2018 |
| WO | WO2018206408 | 11/2018 |
| WO | WO-2018228973 A1 | 12/2018 |
| WO | WO-2018228974 A1 | 12/2018 |

OTHER PUBLICATIONS

Combined Search and Examination Report under Sections 17 and 18(3) for Great Britain Application No. 1709275.0, dated Dec. 1, 2017, 8 pages.
Combined Search and Examination Report under Sections 17 and 18(3) for Great Britain Application No. 1809489.6, dated Dec. 10, 2018, 8 pages.
Deloitte, "Blockchain @ Telco How Block Chain Can Impact The Telecommunications Industry And Its Relevance To The C-Suite Introduction To Block Chain," retrieved from https://www2.deloitte.com/content/dam/Deloitte/za/Documents/technology-media-telecommunications/za_TMT_Blockchain_TelCo.pdf,Nov. 28, 2016, pp. 9-20.
Dorri A., et al., "Blockchain for IoT Security and Privacy: The Case Study of a Smart Home," 2nd IEEE PERCOM Workshops, 2017, 7 pages.
Extended European Search Report for Application No. 17175392.4, dated Nov. 29, 2017, 8 pages.
Extended European Search Report for Application No. 17175393.2, dated Dec. 4, 2017, 8 pages.
International Preliminary Report on Patentability for Application No. PCT/EP2018/065303, dated Dec. 26, 2019, 8 pages.
International Preliminary Report on Patentability for Application No. PCT/EP2018/065233, dated Dec. 26, 2019, 10 pages.
International Preliminary Report on Patentability for Application No. PCT/EP2018/065235, dated Dec. 26, 2019, 8 pages.
International Preliminary Report on Patentability for Application No. PCT/EP2018/065234, dated Dec. 26, 2019, 8 pages.
International Preliminary Report on Patentability for Application No. PCT/EP2018/065302, dated Dec. 26, 2019, 7 pages.
International Search Report and Written Opinion for Application No. PCT/EP2018/065233, dated Jul. 10, 2018, 12 pages.
International Search Report and Written Opinion for Application No. PCT/EP2018/065235, dated Sep. 3, 2018, 9 pages.
International Search Report and Written Opinion for Application No. PCT/EP2018/065302, dated Aug. 3, 2018, 8 pages.
International Search Report and Written Opinion for Application No. PCT/EP2018/065303, dated Aug. 6, 2018, 11 pages.
International Search Report and Written Opinion for Application No. PCT/EP2018/065234, dated Sep. 3, 2018, 9 pages.

(56) References Cited

OTHER PUBLICATIONS

Jover R.P., et al., "dHSS—Distributed Peer-to-Peer Implementation Of The LTE HSS Based On The Bitcoin/Namecoin Architecture," 2016 IEEE International Conference on Communications Workshops (ICC), IEEE, May 23, 2016, pp. 354-359.

Sanda T., et al., "Proposal of New Authentication Method In Wi-Fi Access Using Bitcoin 2.0," 2016 IEEE 5th Global Conference on Consumer Electronics, IEEE, Oct. 11, 2016, pp. 1-5.

Search Report under Section 17 for Great Britain Application No. 1709276.8, dated May 8, 2018, 4 pages.

Application and File History for U.S. Appl. No. 16/620,260, filed Dec. 6, 2019, Inventor: Daniel.

Application and File History for U.S. Appl. No. 16/620,241, filed Dec. 6, 2019, Inventor: Daniel.

Application and File History for U.S. Appl. No. 16/620,328, filed Dec. 6, 2019, Inventor: Daniel.

Application and File History for U.S. Appl. No. 16/620,277, filed Dec. 6, 2019, Inventor: Daniel.

Bitfury Group Limited, "Bitfury: On Blockchain Auditability," Nov. 14, 2016, Retrieved from the Internet: URL: https://bitfury.com/content/downloads/bitfury_white_paper_on_blockchain_auditability.pdf on Jun. 19, 2020, 40 pages.

Combined Search and Examination Report under Sections 17 and 18(3) dated Nov. 7, 2017 for Great Britain Application No. 1709272.7, 8 pages.

Combined Search and Examination Report under sections 17 & 18(3) for Great Britain Application No. 1709273.5, dated Nov. 7, 2017, 8 pages.

Combined Search and Examination Report under sections 17 & 18(3) for Great Britain Application No. 1709274.3, dated Oct. 31, 2017, 8 pages.

Communication pursuant to Article 94(3) EPC for Application No. 18728662.0, dated Jan. 26, 2021, 6 pages.

Communication pursuant to Article 94(3) EPC for Application No. 18728662.0, dated Oct. 28, 2021, 6 pages.

Communication pursuant to Article 94(3) EPC For European Application No. 18728429.4, dated Feb. 4, 2021, 7 pages.

Communication pursuant to Article 94(3) EPC For European Application No. 18728430.2, dated Feb. 4, 2021, 7 pages.

Communication pursuant to Article 94(3) EPC For European Application No. 18728663.8, dated Jan. 26, 2021, 7 pages.

Examination Report under Section 18(3) for Great Britain Application No. 1709275.0, dated Jul. 8, 2020, 5 pages.

Extended European Search Report for Application No. 17175391.6, dated Nov. 14, 2017, 8 pages.

Extended European Search Report for Application No. 17175394.0, dated Nov. 14, 2017, 8 pages.

Extended European Search Report for Application No. 17175395.7, dated Aug. 10, 2017, 11 pages.

Communication pursuant to Article 94(3) EPC for Application No. 18728430.2 dated Apr. 21, 2022, 6 pages.

* cited by examiner

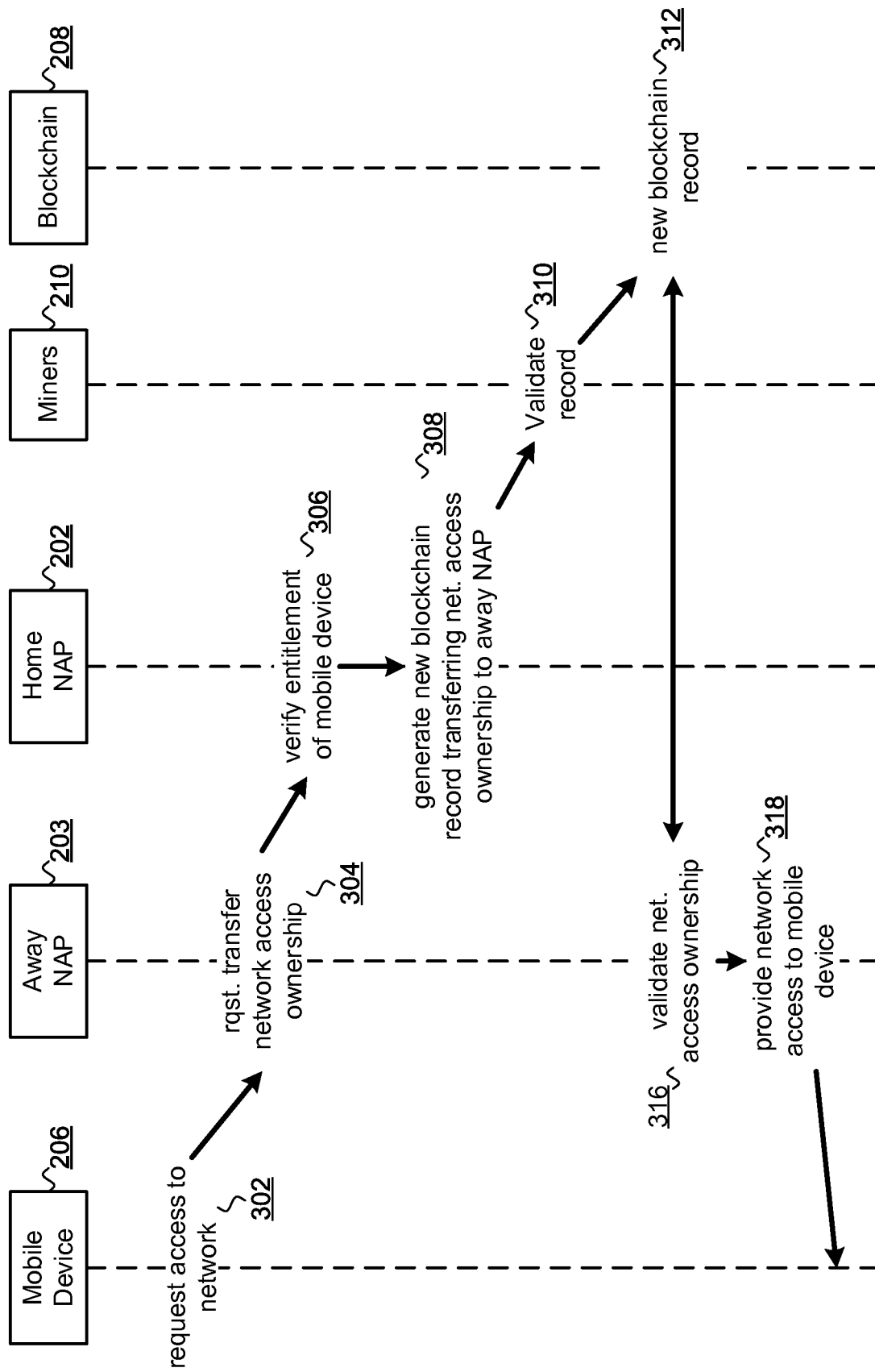

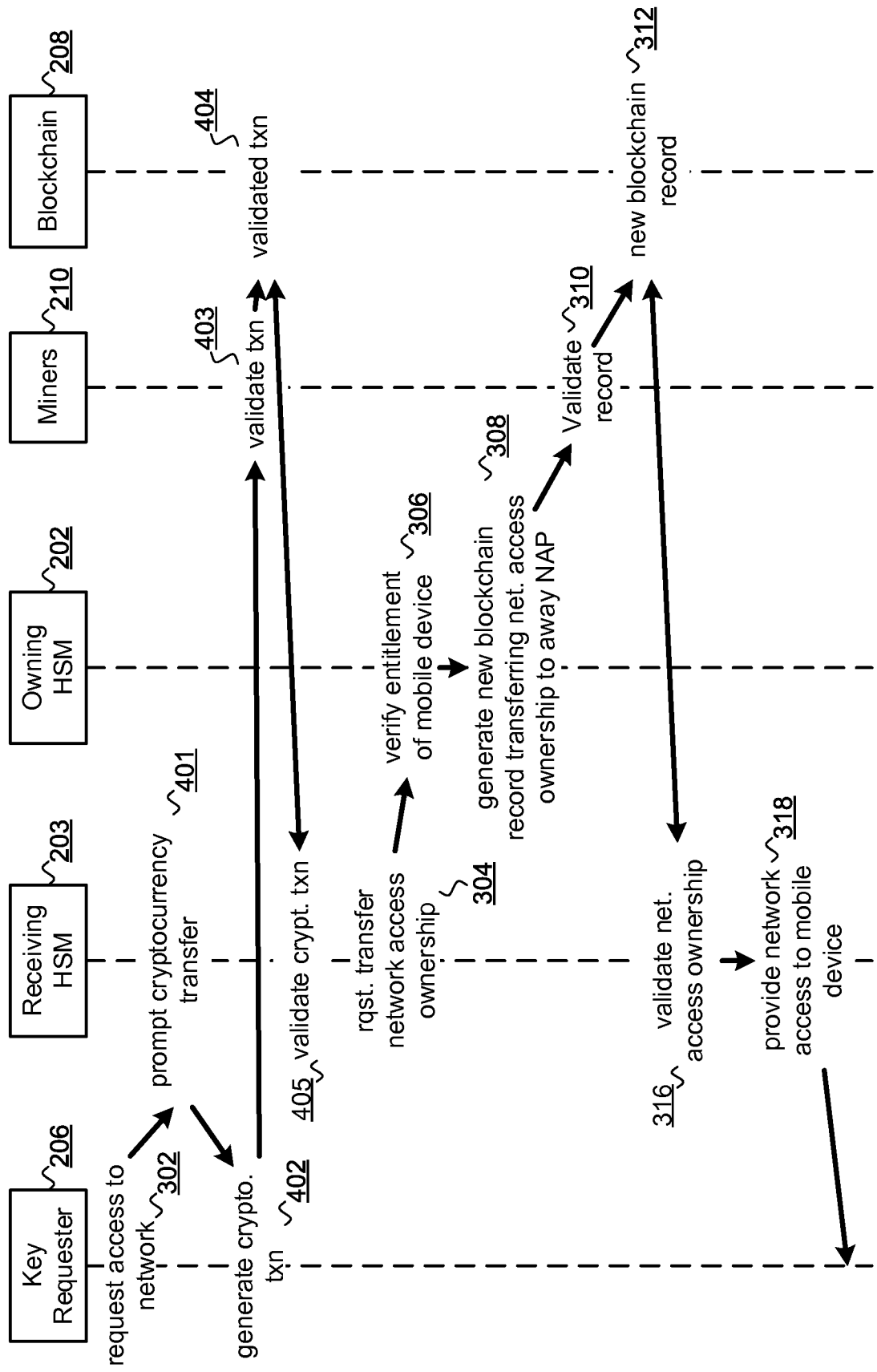

US 11,539,701 B2

NETWORK ACCESS POINT

CROSS-REFERENCE TO RELATED APPLICATIONS

The present application is a National Phase entry of PCT Application No. PCT/EP2018/065234, filed Jun. 8, 2018, which claims priority from European Patent Application No. 17175394.0 filed Jun. 12, 2017, each of which is fully incorporated herein by reference.

TECHNICAL FIELD

The present disclosure relates to improvements to network access points.

BACKGROUND

Network access points for computer networks such as wired or wireless access points provide access to a network such as a local network, a wide area network or a combination of both for computing devices. Such devices can include mobile devices such as mobile computers, cellular telephones, pervasive devices, wearable devices, vehicles such as cars, aircraft, ships, drones and the like, internet of things (IoT) devices including sensors, appliances, detectors, switches, transmitters, receivers and the like, and other mobile devices as will be apparent to those familiar with the field of computer networks. Network connectivity is increasingly an inherent feature of such devices and there is a need to ensure network security when networks, including interconnected networks, are accessed by potentially numerous potentially unfamiliar or unknown devices or classes of device.

Device authentication can be achieved using a centralized authentication mechanism though this assumes network connectivity is pervasive across all networks and such authentication mechanisms are accessible, shared and/or interoperate across all networks that such devices might access, especially in the context of mobile devices that may seek to change networks over time due to, for example, a change in location of the device.

The provision of security for computer networks in such a context is therefore inherently challenging.

SUMMARY

The present disclosure accordingly provides, in a first aspect, a computer implemented method of a network access point for secure network access by a mobile computing device, the mobile device being associated with the access point by a digitally signed record in a blockchain wherein the blockchain is accessible via a network and includes a plurality of records validated by miner computing components, the method comprising: receiving a request from another network access point to associate the mobile device with the other access point, the request having associated identification information for the mobile device; responsive to a verification of an entitlement of the mobile device to access the network, generating a new record for storage in the blockchain, the new record associating the mobile device with the other access point and being validated by the miner components such that the other access point provides access to the network for the mobile device based on the validation of the new record.

In some embodiments the new record for storage in the blockchain includes a reference to the original record for the mobile device such that the new record supersedes the original record to associate the mobile device with the other access point and to disassociate the key from the original access point.

In some embodiments the entitlement of the mobile device is verified based on the identification information for the mobile device.

In some embodiments each of the original and other network access points are wired or wireless network routers.

In some embodiments at least some of the miner components are one or more of: network appliances; and network access points.

In some embodiments the blockchain is a distributed transactional database.

In some embodiments the miner components confirm a state of the blockchain by reaching a consensus as to the state of the blockchain based on a proof of work.

In some embodiments the identification information is a digital signature provided by the mobile device and signed using a private key.

In some embodiments, further responsive to the verification, network access by the mobile device is provided exclusively by the other access point.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 3 is a flow diagram of a method of providing access to a network for a mobile device according to embodiments of the disclosure.

FIG. 4 is a flow diagram of a method of providing access to a network for a mobile device according to alternative embodiments of the present disclosure.

DETAILED DESCRIPTION OF THE DRAWINGS

Figure 1:
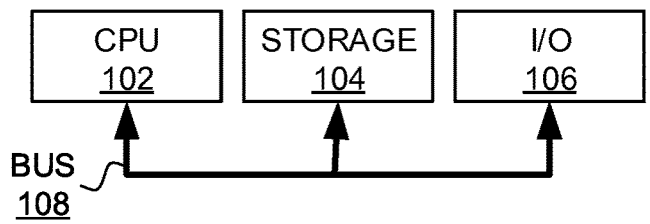
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
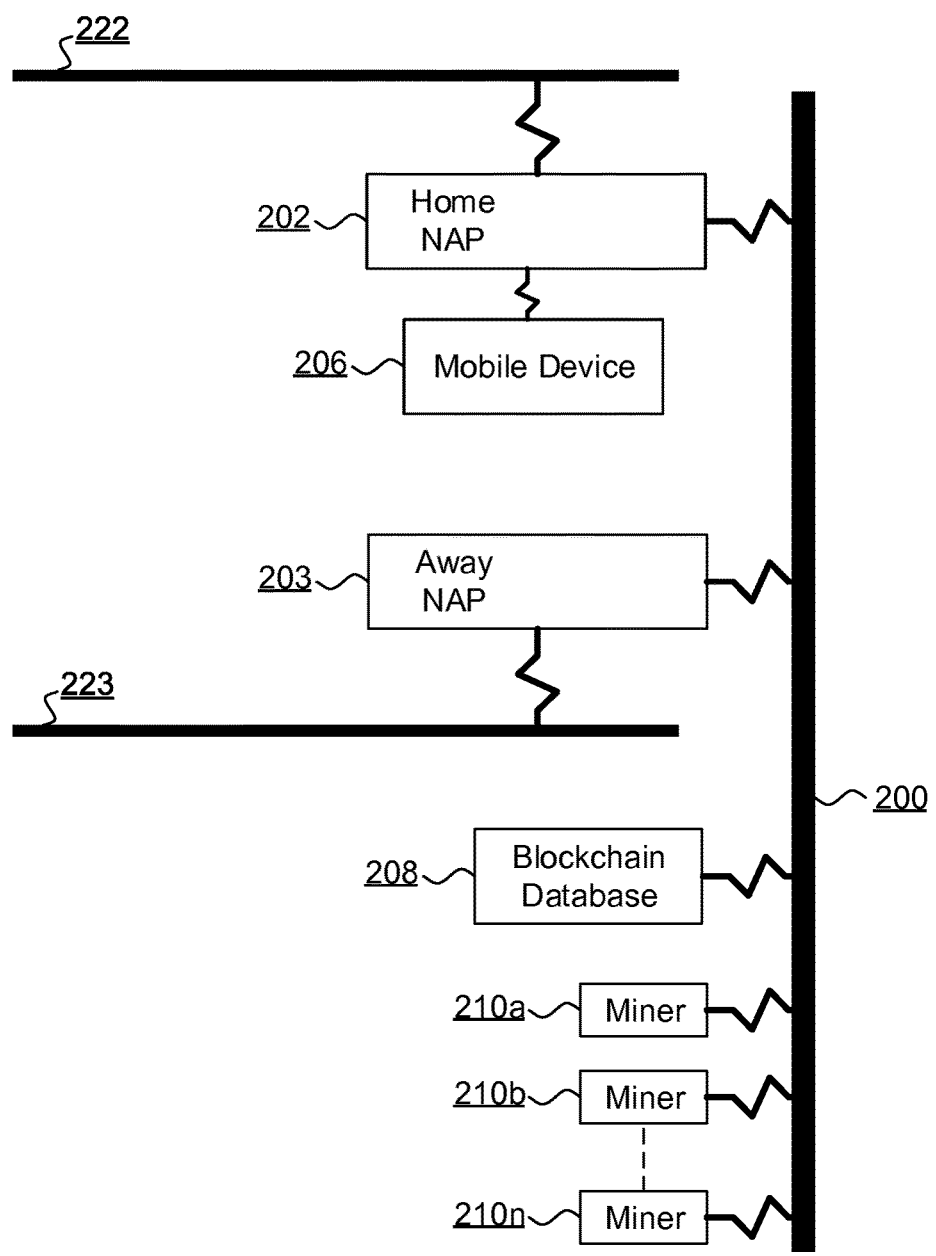
FIG. 2 is a component diagram of an arrangement for providing access to a network for a mobile device according to embodiments of the present disclosure.

FIG. 2 is a component diagram of an arrangement for providing access to a network 200 for a mobile device 206 according to embodiments of the present disclosure. The network 200 is constituted by one or more computer communication networks such as wired or wireless, local area or wide area networks that are commonly accessed by multiple network access points (NAPs). For example, the network 200 can be the internet or an intranet. A mobile device 206 is a moveable computing device with network connectivity facilities such that it can communicate with other computing devices via the network 200. For example, the mobile device 206 is a mobile computer, a smartphone, a tablet device, an internet of things (IoT) device, an appliance, a vehicle (or attached to or embedded in a vehicle) such as a car, boat, aircraft, drone or the like, a robot (or attached to or embedded in a robot) and other mobile devices as will be apparent to those skilled in the art.

The mobile device 206 is initially associated with a first access point, the home NAP 202. The home NAP 202 can include any suitable means for providing the mobile device 206 with access to the network 200 including a wired or wireless router. In addition to providing access to the network 200, the Home NAP 202 can, in some embodiments, provide access to a further network, hereinafter referred to as the home network 222, that can be segregated and/or separated from the network 200. For example, the home network 222 can be a local area network or intranet separated from the network 200 by the home NAP 202 such as by way of one or more of firewalls and/or physical separation and/or other mechanisms as will be apparent to those skilled in the art.

The arrangement of FIG. 2 further includes a further NAP, away NAP 203, as an alternative access point for accessing the network 200. For example, the away NAP 203 can be located at a geographically different location to the home NAP 202 and is suitable for accessing the network 200 at, or in the vicinity of, such different location. In some embodiments, the away NAP 203 also has its own separate network 223 in addition to its accessibility to the network 200.

The arrangement of FIG. 2 further includes, communicatively connected to the network 200, or communicable by the network 200, a distributed sequential transactional database such as a blockchain database 208.

Distributed sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a database is herein referred to as a blockchain though it will be appreciated that other suitable databases, data structures or mechanisms possessing the characteristics essential for embodiments of the present invention could alternatively be used. A blockchain is a distributed chain of block data structures accessed by a network of nodes, referred to here as a miner network. Each block in the blockchain includes a plurality of record data structures known as transactions, each transaction referring or relating to a prior transaction. For example, in a preferred embodiment each blockchain includes a Merkle of hash or digest values for transactions included in the block to arrive at a hash value for the block, which is itself combined with a hash value for a preceding block to generate a chain of blocks (blockchain). A new block of transactions is added to the blockchain by miner software, hardware, firmware or combination systems 210 in a miner network. The miners 210 are communicatively connected to sources of transactions and access or copy the blockchain 208. A miner 210 undertakes validation of the substantive content of a transaction and adds a block of new transactions to the blockchain 208 when a challenge is satisfied as a proof of work, typically such challenge involving a combination hash or digest for a prospective new block and a preceding block in the blockchain 208 and some challenge criterion. Thus, miners 210 in the miner network may each generate prospective new blocks for addition to the blockchain 208. Where a miner 210 satisfies or solves the challenge and validates the transactions in a prospective new block such new block is added to the blockchain 208. Accordingly, the blockchain 208 provides a distributed mechanism for reliably verifying a data entity. The detailed operation of such blockchains and the function of miners in a miner network is beyond the scope of this specification. The manner in which the blockchain 208 and network of miners 210 operate promotes the adoption of verifiably valid transactions as new blocks added to a blockchain 208 in a manner that is persistent within the blockchain 208. Transactions added erroneously or maliciously are not verifiable by other miners 210 in the network and their persistence in the blockchain 208 is undermined. This attribute of blockchains can be exploited by embodiments of the present invention to provide a verifiable and non-repudiable association between a NAP and the mobile device 206 at a point in time so as to ensure the mobile device 206 validly accesses the network 200 via only an associated authorized NAP. I.e., in use, the mobile device 206 accesses the network 200 only by way of an access point associated with the mobile device 206, i.e. initially the home NAP 202. The mobile device 206 can selectively request access to the network 200 via an alternative NAP, such as away NAP 203. For example, the mobile device 206 may request access to the network 200 via the away NAP 203 when the away NAP 203 is located in a different geographic location to the home NAP 202 and the mobile device 206 is in the vicinity of the away NAP 203. The verifiable and non-repudiable association between a NAP and the mobile device 206 at a point in time is provided by embodiments of the present invention as described below with reference to FIGS. 3 and 4.

Notably, in some embodiments, either or each of the home NAP 202 and the away NAP 203 are additionally miners in the miner network. Further, in some embodiments, the miners 210 include one or more of: network appliances; NAPS; network devices; and other computing systems.

FIG. 3 is a flow diagram of a method of providing access to the network 200 for a mobile device 206 according to embodiments of the present disclosure. Initially, at 302, the mobile device 206 requests access to the network 200 from the away NAP 203, for example, because the mobile device 206 is in the vicinity of the away NAP 203. The away NAP 203 communicates 304 a request to the home NAP 202 to relinquish its association with the mobile device 206 in favor of a new association between the mobile device 206 and the away NAP 203 in order that the mobile device can access the network 200 via the away NAP 203.

At 306 the home NAP 202 verifies an entitlement of the mobile device 206 to access the network 200. This verification can be achieved based on identification information for the mobile device 206 that can be provided by the mobile device 206, such as via the away NAP 203. In one embodiment, the mobile device 206 has associated a private key such as a private key issued by the home NAP 202 as an original NAP for the device 206 and the verification can be made based on a digital signature provided by the mobile device 206 and signed using the private key.

Responsive to the verification of entitlement of the mobile device 206, the home NAP 202 generates 308 a new record (a transaction) for storage in the blockchain 208 to record a transfer of association of the mobile device 206 from the home NAP 202 to the away NAP 203. i.e. the new record for the blockchain 208 indicates a relinquishing of the association between the home NAP 202 and the device 206, and a new association between the away NAP 203 and the device 206. The record is provided to miners 210 in the miner network for validation 310 and eventual commitment to the blockchain 208 as a new blockchain record 312, such as a new transaction as part of a new validated block of transactions.

The away NAP 203 validates 316 that it is validly associated with the mobile device 206 for providing network access with reference to, and validation of, the new blockchain record 312 in the blockchain 208. Subsequently, the away NAP 203 provides network access to the mobile device at 318.

The use of the blockchain 208 to record validated transfers of association of NAPS to the mobile device 206 provides a reliable, commonly accessible and commonly validated record of association with protection from repudiation. In some embodiments, network access is provided to the mobile device 206 exclusively by a NAP associated with the device 206 such that a transfer of this association to a NAP effects a change of NAP for providing network access.

The transfer of the associated NAP to the away NAP 203 is provided in the blockchain 208 by the new blockchain record 312. The original association of the device 206 with the home NAP 202 (prior to a transfer of ownership to the away NAP 203) is also recorded by a record in the blockchain 208, i.e. an original record of association for the mobile device 206. In this way, the new blockchain record 312 that transfers the NAP associated with the device 206 to the away NAP 203 supersedes the original record, and the mobile device 206 becomes associated with the away NAP 203, and disassociated from the home NAP 202, by way of the new record 312. In some embodiments, this superseding of the original record is achieved by a reference, in the new blockchain record 312, to the original record such as by way of a hash or somesuch of the original record included in the new record 312 that is then digitally signed by the away NAP 203 and/or the home NAP 202. This is consistent with the typical nature of blockchains in which each subsequent block of transactions includes a signed hash of an immediately preceding block so as to provide the irrefutable chaining of blocks and, therefore, the advantages of the blockchain.

In some security architectures and/or policies, access to, use of and/or availability of secure resources such as network access can be limited such that there are constraints on a use, rate of use or extent of use of such resources. Embodiments of the present disclosure are capable of supporting such models of resource use as described below.

FIG. 4 is a flow diagram of a method of providing access to the network 200 for a mobile device 206 according to alternative embodiments of the present disclosure. In the arrangement according to FIG. 4, the mobile device 206 additionally has associated a quantity of fiat value recorded in the blockchain 208. Such fiat value can be realized as, for example, a cryptocurrency such as bitcoin, Ethereum ether or the like. Actions relating to network access by or for the mobile device 206 can be defined to involve the consumption of such fiat value according to a predetermined policy. For example, a transfer of association of the mobile device 206 to a new NAP can involve the expenditure of cryptocurrency of the device 206 as a mechanism for constraining a number of such transfers, or to impose a restriction on such transfers relative to a resource cost of such transfers or a resource cost of such ownership by the away NAP 203. For example, such resource cost can include a volume or quantity of computing and/or networking resources consumed or forecast to be consumed by the away NAP 203 due to the encumbrance of the away NAP 203 by the responsibility to provide network access for the mobile device 206.

According to the flow of FIG. 4, at 302 the mobile device 206 initially sends a request to the away NAP 203 to access the network 200. Subsequently, the away NAP 203 prompts the transfer of a predetermined quantity of cryptocurrency 401 by the device 206. The transfer can be in favor of the away NAP 203 such that the away NAP 203 receives the cryptocurrency transferred by the device 206. At 402 the mobile device 206 generates a new cryptocurrency transaction 402 for submission to miners 210. The miners 210 validate the transaction 403 which becomes committed to the blockchain 208 as a validated transaction 404. Subsequently, at 405, the away NAP 203 seeks to validate the cryptocurrency transaction 404 to confirm that the transfer took place and there is an appropriate expenditure of cryptocurrency by the device 206. Where such validation is affirmative, the away NAP 203 proceeds from 304 as previously described with respect to FIG. 3 to effect a transfer of association of a NAP to the mobile device 206 and a provision of network access to the device 206.

Notably, where the transfer or cryptocurrency is not completed, such as due to an insufficient quantity of cryptocurrency associated with the mobile device 206 or an insufficient volume of currency transferred, then the transfer of association from 304 does not take place. In this way, the extent of access to the network 200 can be constrained.

Thus, in use, two new blockchain records are created as part of the process of FIG. 4. A first new blockchain record (transaction) is generated, validated and committed to the blockchain 208 to effect the transfer of cryptocurrency. A second new blockchain record (transaction) is generated, validated and committed to the blockchain 208 to effect the transfer of associated NAP.

While the arrangement of FIG. 4 is described such that the cryptocurrency transactions are validated by the same miners 210 and stored in the same blockchain 208 as the NAP association records, it will be apparent to those skilled in the art that a separate blockchain or other sequential distributed transactional database may be employed for the cryptocurrency transactions.

In one embodiment, the verifiable transfer of association from the home NAP 202 to the away NAP 203 for the mobile device 206 can be further supplemented by a facility of the home NAP 202 whereby the home network 222 accessible via the home NAP 202 is additionally made accessible to the mobile device 206 via the away NAP 203. For example, the home NAP 202 can validate the authentic transfer of association from the home NAP 202 to the away NAP 203 with reference to the records in the blockchain 208 and employ technical means to effect network access to the home network 222 for the mobile device 206 via the away NAP 203.

Such technical means can include, for example, opening ports or a firewall of the home NAP 202 to connections from the away NAP 203 via the network 200 for communications by the mobile device 222 with the home network 222. For example, firewall rules, network access rules, port rules and/or access control rules of the home NAP 202 can be adjusted to provide such access. In this way, the mobile device 206 can communicate with devices local to the home NAP 202 and accessible only via the home network 222 by communicating via the away NAP 203 following a transfer or association of the mobile device 206 to the away NAP.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of a first network access point for secure network access by a mobile computing device, the mobile computing device being associated with the first network access point by a digitally signed record in a blockchain, wherein the blockchain is accessible via a network and includes a plurality of records validated by miner computing components, the method comprising:
receiving, by the first network access point, a request from a second network access point to associate the mobile computing device with the second network access point, the request having associated identification information for the mobile computing device; and
responsive to a verification, by the first network access point, of an entitlement of the mobile computing device to access the network, generating, by the first network access point, a new record for storage in the blockchain, the new record associating the mobile computing device with the second network access point and being validated by the miner computing components such that the second network access point provides access to the network for the mobile computing device based on the validation of the new record.

2. The method of claim 1, wherein the new record for storage in the blockchain includes a reference to an original record for the mobile computing device such that the new record supersedes the original record to associate the mobile computing device with the second network access point.

3. The method of claim 1, wherein the entitlement of the mobile computing device is verified based on the identification information for the mobile computing device.

4. The method of claim 1, wherein each of the first network access point and the second network access point is a wired or wireless network router.

5. The method of claim 1, wherein at least some of the miner computing components are one or more of: network appliances; or network access points.

6. The method of claim 1, wherein the blockchain is a distributed transactional database.

7. The method of claim 1, wherein the miner computing components confirm a state of the blockchain by reaching a consensus as to the state of the blockchain based on a proof of work.

8. The method of claim 1, wherein the identification information is a digital signature provided by the mobile computing device and signed using a private key.

9. The method of claim 1, wherein, further responsive to the verification, network access by the mobile computing device is provided exclusively by the second network access point.

10. A computer system comprising:
a processor and memory storing computer program code for a first network access point for secure network access by a mobile computing device, the mobile computing device being associated with the first network access point by a digitally signed record in a blockchain, wherein the blockchain is accessible via a network and includes a plurality of records validated by miner computing components, by:
receiving, by the first network access point, a request from a second network access point to associate the mobile computing device with the second network access point, the request having associated identification information for the mobile computing device; and
responsive to a verification, by the first network access point, of an entitlement of the mobile computing device to access the network, generating, by the first network access point, a new record for storage in the blockchain, the new record associating the mobile computing device with the second network access point and being validated by the miner computing components such that the second network access point provides access to the network for the mobile computing device based on the validation of the new record.

11. A non-transitory computer-readable storage medium storing a computer program element comprising computer program code to, when loaded into a computer system and executed thereon, cause the computer system to provide secure network access by a mobile computing device, the mobile computing device being associated with a first network access point by a digitally signed record in a blockchain, wherein the blockchain is accessible via a network and includes a plurality of records validated by miner computing components, by:
receiving, by the first network access point, a request from a second network access point to associate the mobile computing device with the second network access point, the request having associated identification information for the mobile computing device; and
responsive to a verification, by the first network access point, of an entitlement of the mobile computing device to access the network, generating, by the first network access point, a new record for storage in the blockchain, the new record associating the mobile computing device with the second network access point and being validated by the miner computing components such that the second network access point provides access to the network for the mobile computing device based on the validation of the new record.

\* \* \* \* \*

UNITED STATES PATENT AND TRADEMARK OFFICE
CERTIFICATE OF CORRECTION

| | |
|---|---|
| PATENT NO. | : 11,539,701 B2 |
| APPLICATION NO. | : 16/620355 |
| DATED | : December 27, 2022 |
| INVENTOR(S) | : Daniel |

It is certified that error appears in the above-identified patent and that said Letters Patent is hereby corrected as shown below:

In the Specification

In Column 2, Line 39, delete "diagram a" and insert -- diagram of a --, therefor.

In Column 3, Line 50, delete "invention" and insert -- disclosure --, therefor.

In Column 4, Line 21, delete "invention" and insert -- disclosure --, therefor.

In Column 4, Line 36, delete "invention" and insert -- disclosure --, therefor.

In Column 7, Line 27, delete "invention" and insert -- disclosure --, therefor.

Signed and Sealed this
Sixteenth Day of May, 2023

Katherine Kelly Vidal
*Director of the United States Patent and Trademark Office*